United States Patent
Horst et al.

Patent Number: 5,569,069
Date of Patent: Oct. 29, 1996

[54] APPARATUS FOR CUTTING WINGS FROM POULTRY

[75] Inventors: Sheldon Horst, Lancaster; Eugene Martin, Denver, both of Pa.

[73] Assignee: Foodcraft Equipment Company, Lancaster, Pa.

[21] Appl. No.: 374,167

[22] Filed: Jan. 18, 1995

[51] Int. Cl.⁶ .................................................. A22C 21/00
[52] U.S. Cl. ............................................ 452/169; 452/170
[58] Field of Search ................................ 452/169, 166, 452/167, 170

[56] References Cited

U.S. PATENT DOCUMENTS

| | | | |
|---|---|---|---|
| 4,562,613 | 1/1986 | Lewis | 452/169 |
| 4,597,136 | 7/1986 | Habenbroek | 452/169 |
| 4,935,990 | 6/1990 | Linnenbank | 452/169 |
| 4,993,115 | 2/1991 | Hazenbroek | 452/169 |
| 5,176,564 | 1/1993 | Hazenbroek | 452/169 |
| 5,407,383 | 4/1995 | Diesing et al. | 452/165 |
| 5,411,434 | 5/1995 | McGoon et al. | 452/165 |

*Primary Examiner*—Willis Little
*Attorney, Agent, or Firm*—Shoemaker and Mattare, Ltd.

[57] ABSTRACT

An apparatus for cutting wings from boned whole poultry breasts includes a pair of spaced chain loops supporting laterally aligned pairs of fixtures which hold the wings to support the breasts and serve as anvils for annular knife blades which are driven outward from a central position to cut the breasts from the wings. Thereafter, the wings remain secured in the fixtures, while first the tips are removed by a guillotine-type cutter, and then the flat wing segment is folded against the drumette before the elbow joint is cut.

12 Claims, 5 Drawing Sheets

APPARATUS FOR CUTTING WINGS FROM POULTRY

BACKGROUND OF THE INVENTION

This invention relates generally to butchering machinery, and more particularly to an apparatus for cutting wings from poultry.

Poultry butchering is increasingly automated. There is a wide variety of machinery from which to choose to perform any number of butchering chores, from plucking to deboning. Such devices have made high-volume processing a reality, while relieving people from a number of unpleasant chores. Butchering machines have the advantage of consistency and tirelessness, but generally are not as adaptable as their human counterparts to changing situations. One way of improving the adaptability of machines is to make them modular, that is, readily replaced stand-alone devices. Modularity also gives the packer flexibility in terms of the cuts he can produce.

There are already many different devices for removing wings and cutting the wings into segments (drumette, flat and wing tip). Perhaps the most difficult cut is at the shoulder, where the anatomy is complex and the exact location of the joint is not so easy to see. A knife or other flat blade has typically been used to sever the joint.

SUMMARY OF THE INVENTION

An object of the invention is to enable poultry producers to produce clean, attractive arcuate cuts at the shoulder joint when removing wings from breasts, so as to enhance the appearance and consistency of both parts Another object of the invention is to keep from producing bone chips when removing poultry wings.

A further object of the invention is to automate fully the cutting up of poultry wings, into three segments.

These and other objects are attained by an apparatus for cutting wings from boned whole poultry breasts includes a pair of spaced chain loops supporting laterally aligned pairs of fixtures which both hold the wings to support the breasts and served as anvils for annular knife blades which are driven outward from a central position to cut the breasts from the wings. Thereafter, the wings remain secured in the fixtures, while first the tips are removed by a guillotine-type cutter, and then the flat is folded against the drumette before the elbow joint is cut. The various pieces fall onto respective conveyors for subsequent packaging.

BRIEF DESCRIPTION OF THE DRAWINGS

In the accompanying drawings.

DESCRIPTION OF THE PREFERRED EMBODIMENT

Figure 1:
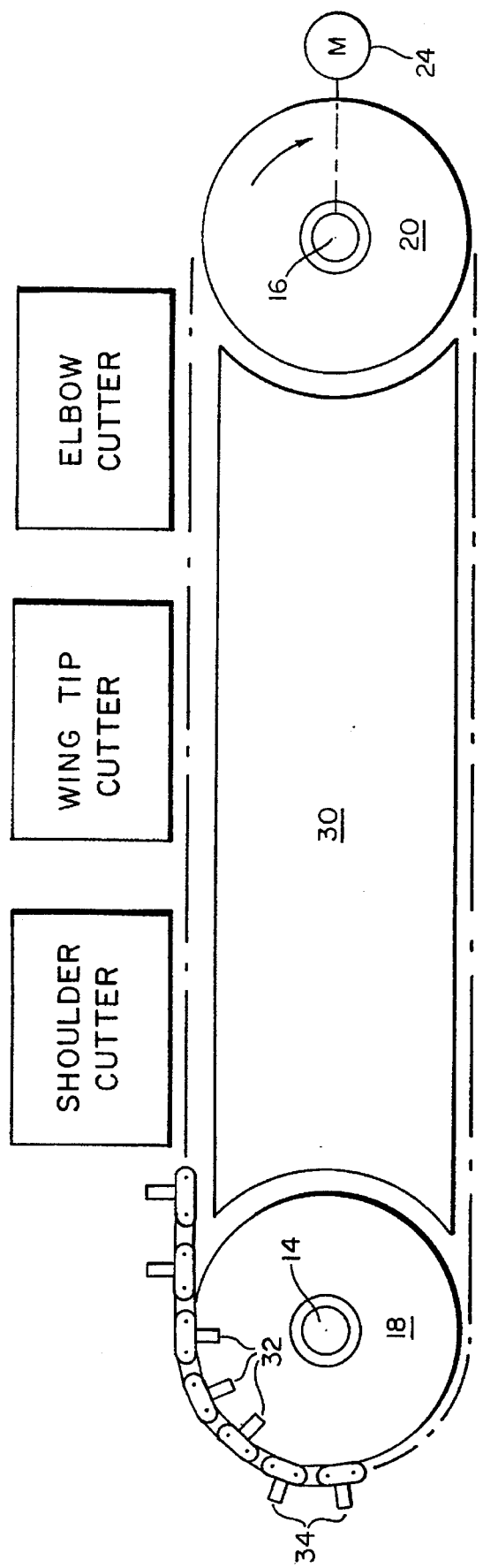
FIG. 1 is a diagrammatic side view of a machine embodying the invention.
Figure 2:
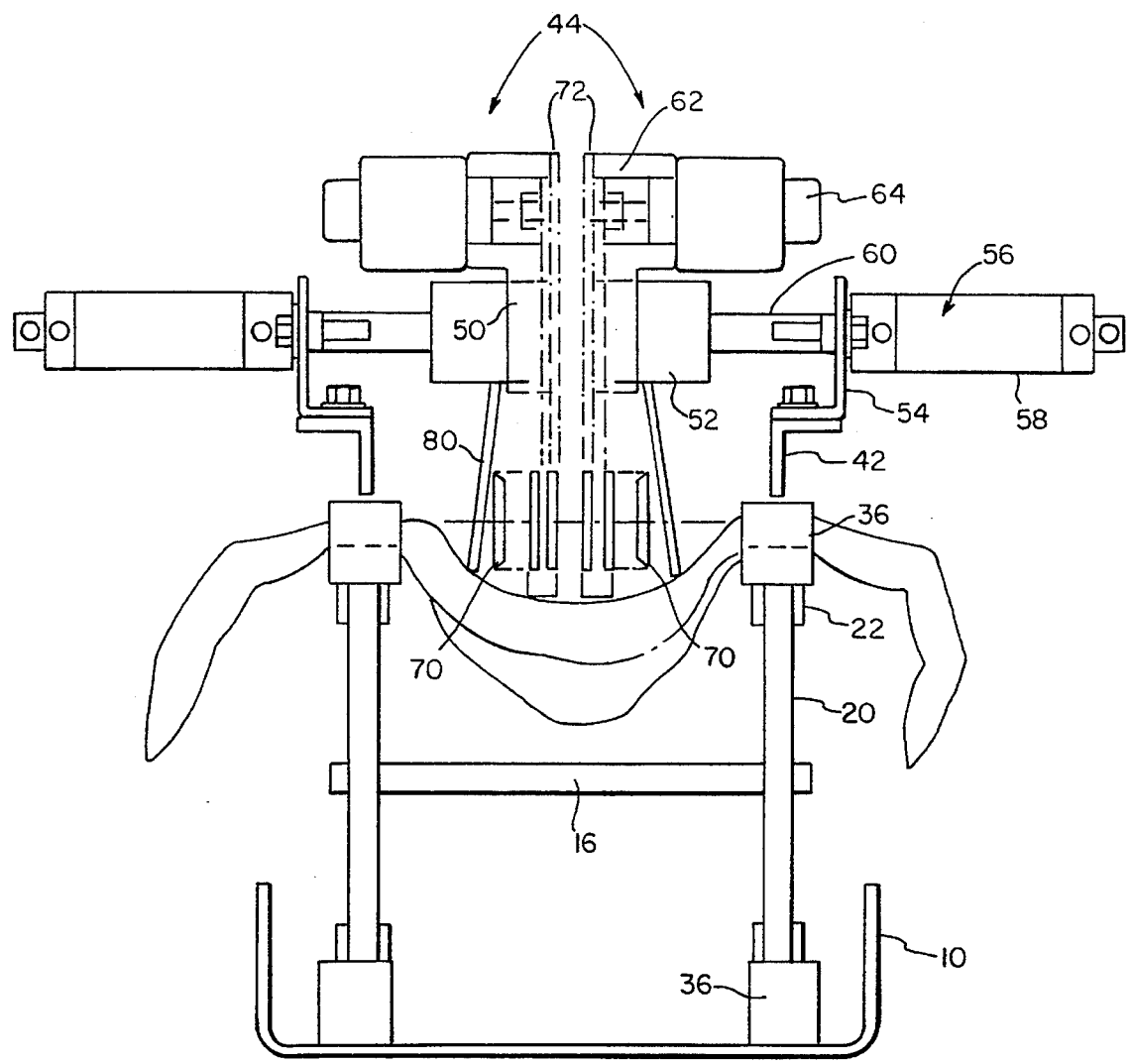
FIG. 2 is a sectional view, looking upstream on plane 2—2 in FIG. 1, showing a shoulder cutting device.
Figure 3:
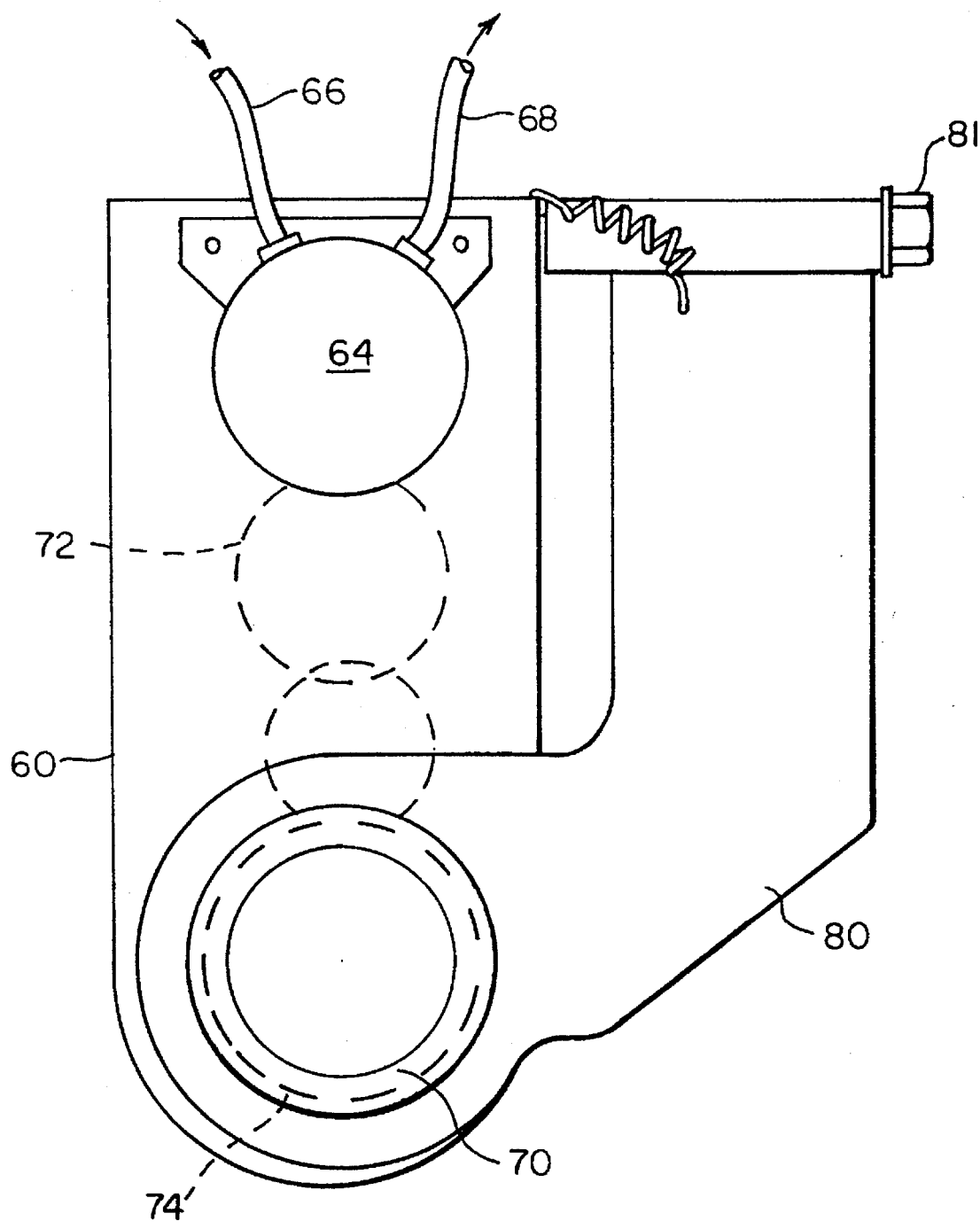
FIG. 3 is a side elevation of the rotary cutter shown in FIG. 2.

The general layout of a machine embodying the invention is shown in FIG. 1. The machine includes a frame 10 (FIG. 2) to which bearings are attached for supporting two shafts 14,16 on which respective pairs of sprockets 18,20 are mounted. Conveyor chains 22 run on the sprockets. The chains are about eight inches apart. One of the shafts, preferably the downstream one 16, is driven intermittently by a motor 24 through a speed reduction unit. The chains are caused to index a fixed distance, such as seven and a half inches, each cycle.

Each chain is supported from below, along its top run, by the broad edge of a vertical UHMW (ultra-high molecular weight polyethylene) plate 30. The chain slides along this edge, and is kept aligned with it laterally by a series of tabs 32, welded to the chain's link plates, facing the interior of the loop. The inwardly facing tabs 32 straddle the UHMW plate on either side. The chain also has outwardly facing tabs 34, having holes through which bolts are passed to secure specially shaped UHMW fixtures 36 for supporting the wings of a deboned breast—one from which the rib cage has been removed.

Figure 5:
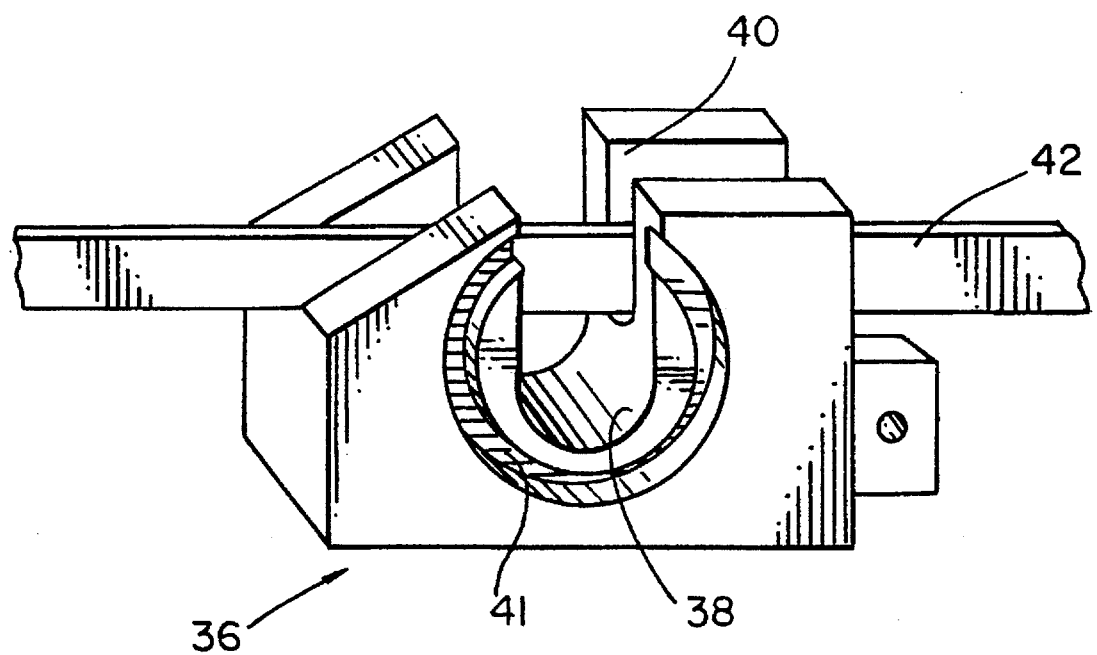
FIG. 5 is a side view of one of the poultry wing support fixtures shown in FIG. 2.

Each fixture 36, as shown in FIG. 5, is substantially a rectangular block transected by a large central recess 38 having a "U" shape. The width of the recess is sufficient to receive the upper segment or "drumette" of a chicken wing, i.e., the segment containing the humerus, but its width is smaller than the diameter of the shoulder ball. A smaller slot 40 is cut lengthwise into the top of the block, intersecting the transverse groove 38. A mounting boss protrudes from the block, and fits between a pair of the outwardly protruding chain tabs 34, to which it is bolted. A circular groove 41, about ¼ inch wide by ⅜ inch deep, and having a mean diameter substantially equal to that of the annular blade, encircles the bottom of said recess, so that the blade can enter the groove, to insure that the blade completely severs the shoulder.

A metal bar 42 is affixed to the frame above each chain loop, and within the slot 40 of each fixture. The bar, and the plate 30, constrain the fixture to move only within a vertical plane, and prevent it from rocking sideways. The bar confines the wing from above, so that it cannot escape from the fixture.

Now, at the upstream end of the device, there is a loading station where a whole, boned chicken breast is transferred by seating the wings in the recesses fixtures. The fixtures hold the humeri so that their exposed shoulder ends are aligned horizontally. Just downstream of the loading station, the wings enter under the constraining bars 42, which thereafter hold them in the recesses. The unsupported breast meat, having no skeleton by now, sags sufficiently between the wings that it can pass beneath a pair of annular-blade cutters 44.

Each cutter 44 is slidingly supported on a pair of fixed, parallel, horizontal rods (not shown) extending transverse to the chains and above them. Each cutter has a metal housing 50 affixed to a UHMW block 52 which acts as a sliding bearing for the rods. The rods, each about a foot long, is mounted between brackets 54 which are affixed to the channels 42. Outboard of the brackets are opposed double-acting linear motors 56 (pneumatic cylinders). In each motor, the cylinder 58 proper is affixed to the bracket 54, while its piston rod 60 is affixed to the cutter housing. Air to operate the cylinder is controlled by a valve (not shown) which is operated in synchronization with the chain drive motor.

Each cutter housing 62 has an enlarged head to which a hydraulic rotary motor 64 is attached. The motor has an inlet, fed from an intermittently pressurized supply line 66, and an outlet to which a return line 68 is connected. The motor drives an annular blade 70 through a train of gears 72 within the housing. The lowermost gear is a ring gear 74 extending around the annular blade. The blade's cutting edge protrudes from the housing in one direction (away from the other cutter device) about an inch, toward one of the fixtures, which acts as an anvil.

Each annular blade has an inside diameter of about 1.75 inch and wall thickness of about 0.125 inch, and is internally beveled to a sharp edge. The interior of the blade is completely open, and its axis is substantially aligned with the humerus of one of the wings at a dwell position of the breasts. The wings are severed from the breasts when the cutters are driven outward—with the blades rotating at about 800 rpm—away from the position illustrated in FIG. 2, by the linear motors 56. The exposed portion of each annular blade extends through a somewhat larger hole in a stripper plate 80 whose upper end is pivotally secured to the upstream face of the housing by a bolt 81, and which is biased by a spring so that its lower portion, surrounding the annular blade, tends toward a position just outboard of the cutting edge. When the blade is actually cutting, the breast meat forces the stripper inward toward the housing; when cutter is retracted, the stripper pushes any accumulated flesh off the blade.

Just downstream of the shoulder cutters are a pair of wing tip cutters 82, each comprising a knife 94 mounted on a horizontal UHMW plate 86 whose lateral edges are received in respective fixed metal U-channels 88 so that the plate can slide freely perpendicular to the center plane of the machine. The plate is reciprocated by a crank arm 90 driven by a motor (not shown) within the machine. The crank tip has a stroke of about seven inches, and is linked to the plate by a pin extending through a slot at the outboard end of the plate. The plate 86 itself has pair of fingers 104 on either side of a gap 92 at the end opposite the crank, and the knife 94 is installed within this slot. The knife comprises a half-inch diameter rod 94 whose nose 96 is rounded and bent downward about 20°, below the upper surface of the plate. A sharp, vertical blade 98, angled rearward like a shark's fin, is secured in a narrow slot 100 running lengthwise of the rod.

When the wing tip cutter knife is driven inward by the crank 90, the fingers and the knife 84 extend through matching-geometry holes in a UHMW anvil 102, mounted to the frame just outside the conveyor chains. The fingers 104 of the plate enter the smaller holes 106, while the knife (rod and blade) enters the central slot 108. The wing tip, now outside the anvil, cannot pass through the slot, and hence is severed from the rest of the wing.

At the downstream end of the machine, there is an elbow cutter 110, which separates the two upper wing segments, the flat and the drumette, from one another. The elbow cutter comprises a horizontal stationary blade 112, mounted on the machine frame and extending away from the center plane of the machine, in the path of the elbow. Upstream of the blade, there are means for bending the elbow preparatory to cutting. The preferred bending means comprises a fixed round bar 114, around which the elbow is bent, and a horizontal folding plate 116 mounted for oscillation on a vertical pivot shaft 118 about ten inches from the center plane. The shaft is turned by a pneumatic cylinder (not shown) driving a lever arm at the bottom of the shaft.

Figure 4:
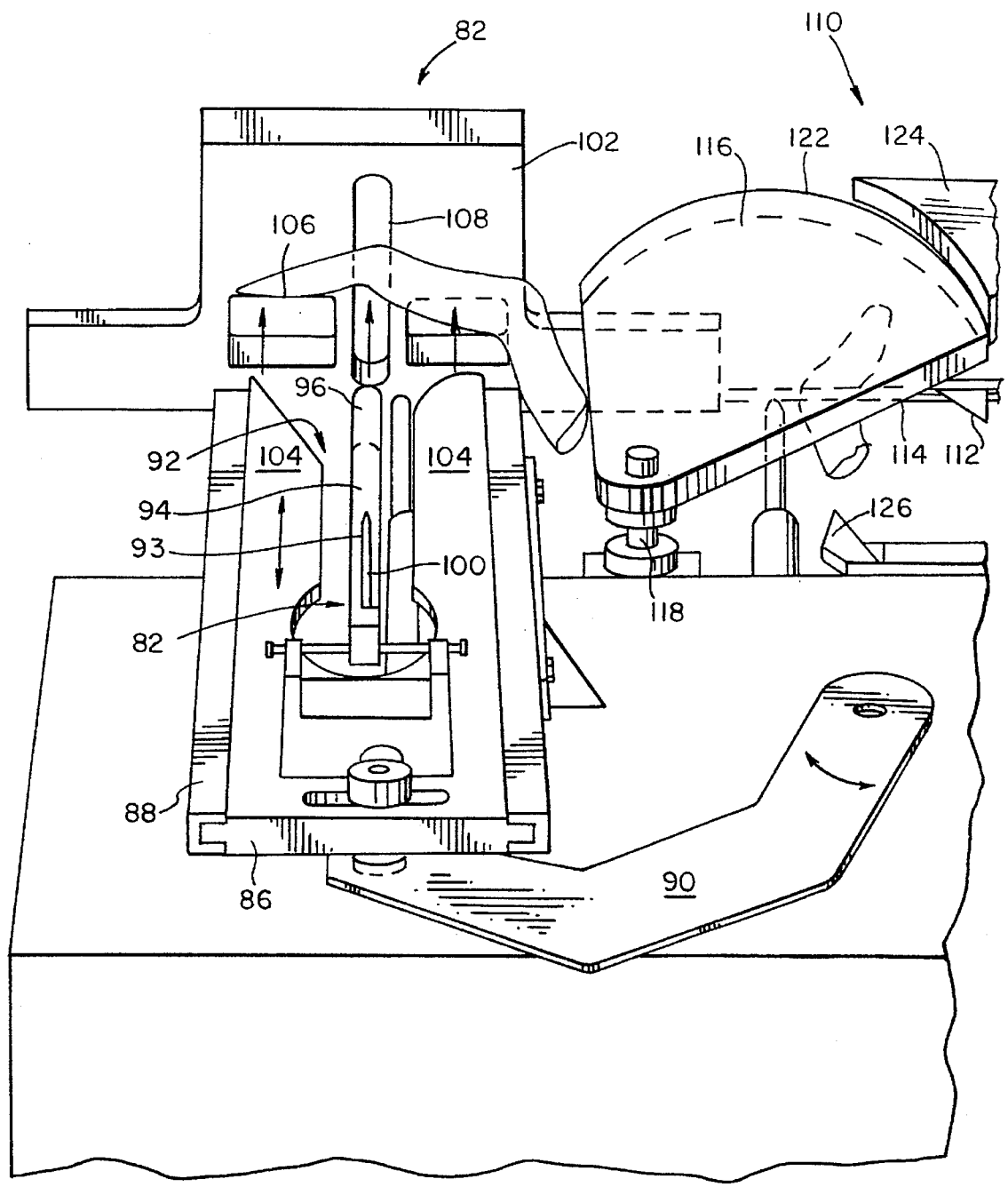
FIG. 4 is an oblique view of a portion of the machine in which the lower wing joints are severed.

The folding plate has a curved inner edge 122, whose bottom edge is beveled, as indicated by the broken line in FIG. 4. The contour of the curved edge is designed so that, as the plate pivots inward, the force applied to the wing is always in the transverse direction. This way, the wing does not get deflected upstream or downstream as it is bent. When rotated fully inward, the curved inner edge 122 seats against a similarly curved rest 124 attached to the machine; this extends the "ceiling" provided by the folding plate. As the wing (still held firmly by the fixture, and now consisting of only the upper two segments) approaches the blade 112, it is bent sharply around the round bar as the folding plate is driven inward. This bending stresses the elbow, which helps produce a clean cut. Just upstream of the outward-facing blade 112, there is an inward-facing blade 126, which is also stationary and makes a preliminary cut or nick in the outside of the elbow, to allow the joint to separate somewhat. The bar 114 also accurately positions the elbow with respect to the blade, so that the blade cuts between the bones, rather than through either of them.

We have not shown or described means for receiving the various parts of the chicken as they are cut, but it should be understood that as each cut is made, one part falls onto a conveyor, or into a bin, for subsequent processing.

The diameter of the annular blades is not critical, other than that it must be sufficiently great to clear the humerus reliably, as bone chip production is to be avoided. The size selected may depend on a number of factors including the size of the birds being butchered, and the preferences of the packer.

Since the invention is subject to modifications and variations, it is intended that the foregoing description and the accompanying drawings shall be interpreted as illustrative of only one form of the invention, whose scope is to be measured by the following claims.

I claim:

1. An apparatus for cutting wings from poultry comprising a frame, an endless conveyor supported by the frame, said conveyor comprising a pair of parallel chain loops, a series of wing-holding fixtures attached at intervals to each of said chains, each said fixture having an upwardly open recess for receiving and holding the drumette of a wing attached to a whole boneless chicken breast, whereby the breast is suspended, by its wings, between opposite fixtures, a pair of shoulder cutting devices for cutting the wings from the breast, each such device including an annular blade and a motor for rotating the blade, means for driving the cutting devices away from each other from a first position above the breast to a second position engaging the fixtures, so that the blades move along a common axis substantially coincident with each humerus, thereby severing the wing from the breast with a semicylindrical cut.

2. The invention of claim 1, further comprising a stripper plate having an aperture aligned with the respective annular blade, and being spring biased away from the blade, whereby the stripper plate is compressed against the shoulder cutting device, and upon completion of the cut, springs back, removing any flesh adhering to the blade.

3. The invention of claim 1, wherein each fixture has, on its side facing the shoulder cutting blade, a circular groove having a mean diameter substantially equal to that of the annular blade, and encircling the bottom of said recess, so that the blade can enter the groove, to insure that the blade completely severs the shoulder.

4. The invention of claim 3, wherein the groove is about one-quarter inch wide and about ⅜ inch deep.

5. The invention of claim 3, wherein the fixture has a slot in its upper surface, running parallel to the conveyor, and further comprising a fixed bar straddled by the slot to close off said recess after wing drumettes have been placed in it and thereby retain the wings for further processing after the breasts have been severed.

6. The invention of claim 1, further comprising a wing tip cutter disposed downstream of the shoulder cutting devices, and including an vertical anvil having plural openings therein, a sliding knife assembly including a base plate constrained to move in a direction substantially transverse to the conveyor, a cylindrical knife holder affixed to the base plate, said knife holder having a blunt nose bent downward to drive below the wing tip and through one of said openings in the anvil, and an upwardly extending knife blade mounted in a slot in the knife holder, and means for driving the base plate toward the anvil.

7. The invention of claim 6, wherein the driving means comprises a crank arm driven by a motor and a pin-in-slot connection between the distal end of the crank arm and the base plate.

8. The invention of claim 6, wherein the base plate comprises a pair of fingers extending parallel to and below the blade holder, with a gap between the fingers below the blade holder, each of said fingers being adapted to enter respective ones of said openings in the anvil when the blade holder is driven through its opening.

9. The invention of claim 1, further comprising an elbow cutting device disposed downstream of the shoulder cutting devices, and including means for bending the flat segment of the wing around a guide rod, to stress the joint in preparation for cutting, and a first blade mounted on the rod for cutting the elbow from the inside.

10. The invention of claim 9, further comprising a second blade mounted facing the first blade, for cutting the elbow from the outside.

11. The invention of claim 10, wherein both said first and second blades are stationary and make incisions as the wing is moved over them by the conveyor.

12. The invention of claim 9, further comprising a swinging plate disposed above the rod, for engaging the flat segment of the wing and bending it upward around the rod.

* * * * *